Patented Nov. 12, 1946

2,410,949

UNITED STATES PATENT OFFICE 2,410,949

LIQUID PHARMACEUTICAL PREPARATION

Walter Karrer, Riehen, near Basel, Switzerland, assignor to Hoffmann-La Roche Inc., Nutley, N. J., a corporation of New Jersey No Drawing. Application February 5, 1943, Serial No. 474,878. In Switzerland April 1, 1942

4 Claims. (Cl. 167—65)

Since it was ascertained that citrin causes an increase of capillary resistance (Deutsche Medizinische Wochenschrift, year 1936, page 1325), it is not probable that the same physiological action also appertains to various pure and naturally occurring glucosides of the flavon group and their aglucones (Klinische Wochenschrift, year 1941, page 1265). However, these pure flavon glucosides and their aglucones in question are hardly soluble in water so that there is no possibility of preparing aqueous solutions thereof for clinical testing by injection. The administration of these substances was, therefore, limited to the oral application, and demonstration of the therapeutic effect has not been definitely established.

It has now been found that on using sarcosin anhydride as material for increasing the solubility, sufficiently concentrated and stable solutions can be prepared, not only of the glucosides in question but also of the aglucones, which are thus made available for experimental injection. Sarcosin anhydride, in comparison with other materials which might be considered for increasing the solubility, has the great advantage that it is well tolerated even in concentrated aqueous solutions and that even in high doses it is absolutely harmless.

Example 1

15 parts by weight of quercitrin are shaken for 3 hours with 1000 parts by weight of a 30 per cent aqueous solution of sarcosin anhydride. The product is filtered, whereby a clear, yellow solution with a quercitrin content of 1.4 to 1.5 per cent is obtained. It can be filled into ampuls and sterilised.

Example 2

20 parts by weight of neohesperidin are shaken for 3 hours with 1000 parts by weight of a 20 per cent aqueous solution of sarcosin anhydride. The product is filtered off from any substance that may have remained undissolved. A clear, light yellow solution with a neohesperidin content of about 2 per cent is obtained. The solution can be sterilised.

Example 3

7 parts by weight of hesperetin are shaken for 3 hours with 1000 parts by weight of a 30 per cent aqueous solution of sarcosin anhydride. The product is filtered and a clear, yellowish solution with a hesperetin content of 0.6 to 0.7 per cent is obtained. The solution can be sterilised.

I claim:

1. An aqueous solution of a substance of the group consisting of flavon glucosides and aglucones thereof, said solution containing said substance in an amount greater than that soluble by itself in the aqueous solution, and sarcosin anhydride present in an amount effective to maintain said solubility.

2. A liquid pharmaceutical preparation containing water, sarcosin anhydride, and quercitrin, said quercitrin being present in an amount greater than that soluble by itself in the preparation, and said sarcosin anhydride being present in an amount effective to maintain said solubility.

3. A liquid pharmaceutical preparation containing water, sarcosin anhydride, and neohesperidin, said neohesperidin being present in an amount greater than that soluble by itself in the preparation, and said sarcosin anhydride being present in an amount effective to maintain said solubility.

4. A liquid pharmaceutical preparation containing water, sarcosin anhydride, and hesperetin, said hesperetin being present in an amount greater than that soluble by itself in the preparation, and said sarcosin anhydride being present in an amount effective to maintain said solubility.

WALTER KARRER.